(12) United States Patent
Bonde, III (10) Patent No.: US 6,619,338 B2
(45) Date of Patent: Sep. 16, 2003

(54) MATERIAL LOADING SKIRT SYSTEM

(76) Inventor: Henry C. Bonde, III, 1310 S. Shore Dr., Detroit Lakes, MN (US) 56501

( * ) Notice: Subject to any disclaimer, the term of this patent is extended or adjusted under 35 U.S.C. 154(b) by 0 days.

(21) Appl. No.: 10/053,255

(22) Filed: Jan. 18, 2002

(65) Prior Publication Data

US 2003/0136462 A1 Jul. 24, 2003

(51) Int. Cl.$^7$ ................................................ B65G 11/00
(52) U.S. Cl. ...................... 141/114; 141/286; 141/382; 141/383; 414/291; 414/292; 414/299; 193/25 C
(58) Field of Search .......................... 141/93, 114, 286, 141/382, 383, 390–392; 414/291, 292, 299, 328; 193/25 C, 25 E (56) References Cited

U.S. PATENT DOCUMENTS

| | | | |
|---|---|---|---|
| 569,180 A | * 10/1896 | Donally | 141/302 |
| 1,395,701 A | 11/1921 | Cain | |
| 1,894,867 A | * 1/1933 | Hoffman | 141/392 |
| 3,738,464 A | 6/1973 | Ortlip et al. | 193/25 |
| 3,899,009 A | * 8/1975 | Taylor | 141/59 |
| 4,182,591 A | 1/1980 | Stanelle | 414/291 |
| 4,557,364 A | 12/1985 | Ball | 193/25 |
| 4,942,953 A | 7/1990 | Chefson | 193/25 |
| 5,052,451 A | * 10/1991 | Gentilcore et al. | 141/67 |
| 5,332,012 A | 7/1994 | Svendsen | 141/93 |
| 5,509,452 A | * 4/1996 | Tammera | 141/207 |
| 5,571,249 A | * 11/1996 | Boylen | 141/86 |
| 5,582,219 A | 12/1996 | Claar et al. | 141/93 |
| 5,636,959 A | 6/1997 | Kroell et al. | 414/137.4 |

* cited by examiner

Primary Examiner—J. Casimer Jacyna
(74) Attorney, Agent, or Firm—Michael S. Neustel (57) ABSTRACT

A material loading skirt system for reducing contamination of material during loading. The material loading skirt system includes a tubular skirt having a narrow end and a broad end, a first elastic band is attached to the broad end of the tubular skirt, and a second elastic band is attached to the narrow end of the tubular skirt. The narrow end of the tubular skirt is snugly attachable about a loading tube and the broad end of the tubular skirt is snugly attachable about a container hatch. The tubular skirt has a tapered structure from the broad end to the narrow end.

18 Claims, 7 Drawing Sheets

MATERIAL LOADING SKIRT SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to loading skirts and more specifically it relates to a material loading skirt system for reducing contamination of material during loading.

2. Description of the Prior Art

Examples of patented devices which are related to the present invention include U.S. Pat. No. 5,582,219 to Claar et al.; U.S. Pat. No. 1,395,701 to Cain; U.S. Pat. No. 3,738,464 to Ortlip et al.; U.S. Pat. No. 4,182,591 to Stanelle; U.S. Pat. No. 4,557,364 to Ball; U.S. Pat. No. 4,942,953 to Chefson; U.S. Pat. No. 5,332,012 to Svendsen; and U.S. Pat. No. 5,636,959 to Kroell et al.

While these devices may be suitable for the particular purpose to which they address, they are not as suitable for reducing contamination of material during loading. Conventional devices do not provide an easy to utilize disposable loading skirt system that effectively reduces contamination of material during loading thereof.

In these respects, the material loading skirt system according to the present invention substantially departs from the conventional concepts and designs of the prior art, and in so doing provides an apparatus primarily developed for the purpose of reducing contamination of material during loading.

SUMMARY OF THE INVENTION

In view of the foregoing disadvantages inherent in the known types of material loading devices now present in the prior art, the present invention provides a new material loading skirt system construction wherein the same can be utilized for reducing contamination of material during loading.

The general purpose of the present invention, which will be described subsequently in greater detail, is to provide a new material loading skirt system that has many of the advantages of the material loading devices mentioned heretofore and many novel features that result in a new material loading skirt system which is not anticipated, rendered obvious, suggested, or even implied by any of the prior art material loading devices, either alone or in any combination thereof.

To attain this, the present invention generally comprises a tubular skirt having a narrow end and a broad end, a first elastic band is attached to the broad end of the tubular skirt, and a second elastic band is attached to the narrow end of the tubular skirt. The narrow end of the tubular skirt is snugly attachable about a loading tube and the broad end of the tubular skirt is snugly attachable about a container hatch. The tubular skirt has a tapered structure from the broad end to the narrow end.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a material loading skirt system that will overcome the shortcomings of the prior art devices.

A second object is to provide a material loading skirt system for reducing contamination of material during loading.

Another object is to provide a material loading skirt system that fits upon various sizes of loading tubes and container hatches.

An additional object is to provide a material loading skirt system that snugly and in a sealed manner engages the loading tube and the container hatch simultaneously.

A further object is to provide a material loading skirt system that improves the sanitation of food grate material being loaded.

Another object is to provide a material loading skirt system that is tapered to conform to the shape of the loading tube and the container hatch.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Turning now descriptively to the drawings, in which similar reference characters denote similar elements throughout the several views, FIGS. 1 through 7 illustrate a material loading skirt system 10, which comprises a tubular skirt 20 having a narrow end 21 and a broad end 23, a first elastic band 30 is attached to the broad end 23 of the tubular skirt 20, and a second elastic band 40 is attached to the narrow end 21 of the tubular skirt 20. The narrow end 21 of the tubular skirt 20 is snugly attachable about a loading tube 12 and the broad end 23 of the tubular skirt 20 is snugly attachable about a container hatch 14. The tubular skirt 20 has a tapered structure from the broad end 23 to the narrow end 21.

As shown in FIGS. 1, 2, 4, 6 and 7 of the drawings, the tubular skirt 20 has an elongate and tapered structure with an outer surface 22 and an inner surface 24. The tubular skirt 20 may have various cross sectional shapes such as circular, oval, square, triangular and the like. The tubular skirt 20 is preferably comprised of a flexible material such as plastic. The tubular skirt 20 is further comprised of a transparent or semi-transparent material for allowing viewing of the material loading. The tubular skirt 20 may be comprised of polyethylene or other suitable materials.

Figure 1:
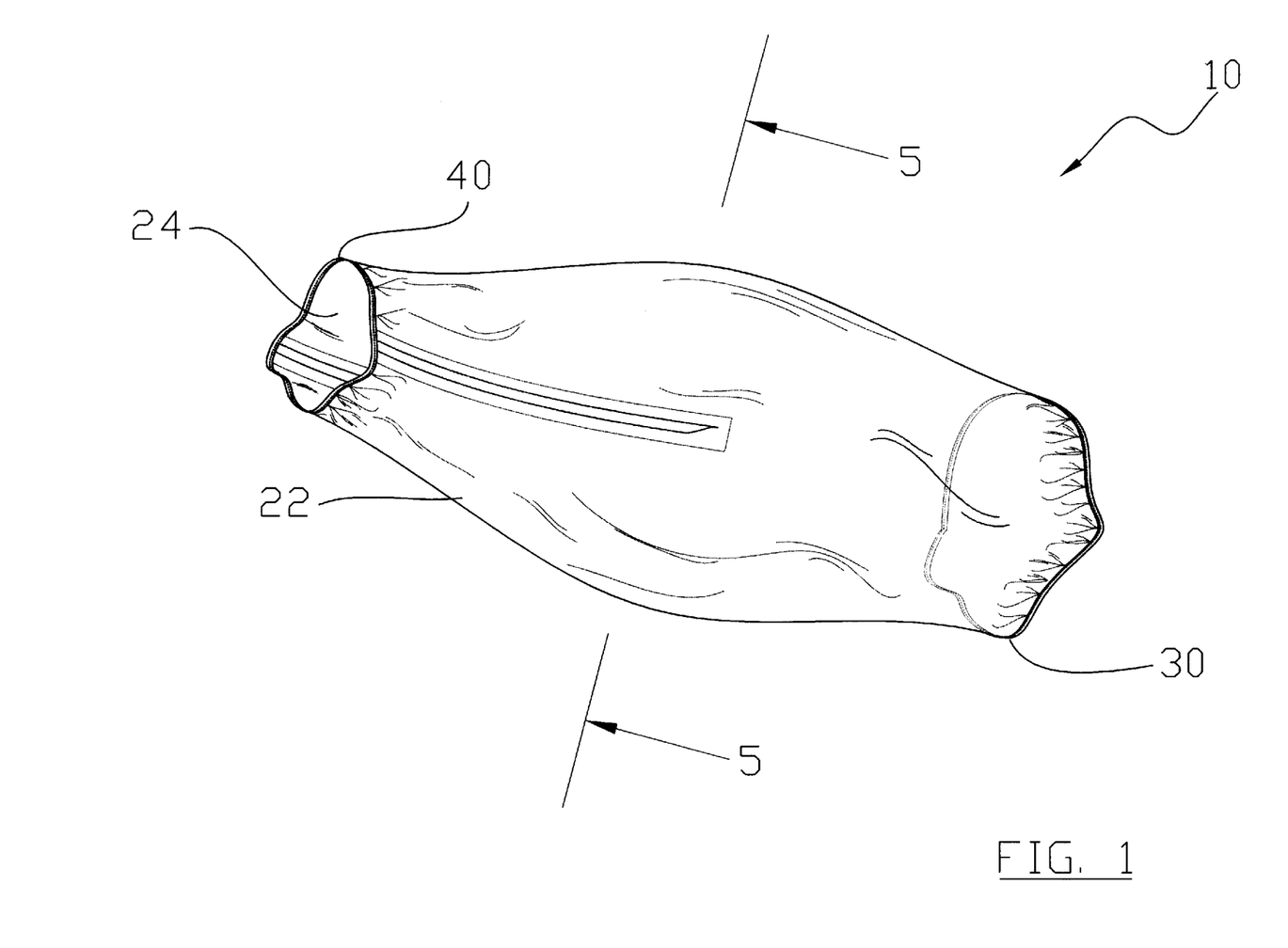
FIG. 1 is an upper perspective view of the present invention in a relaxed position.
Figure 2:
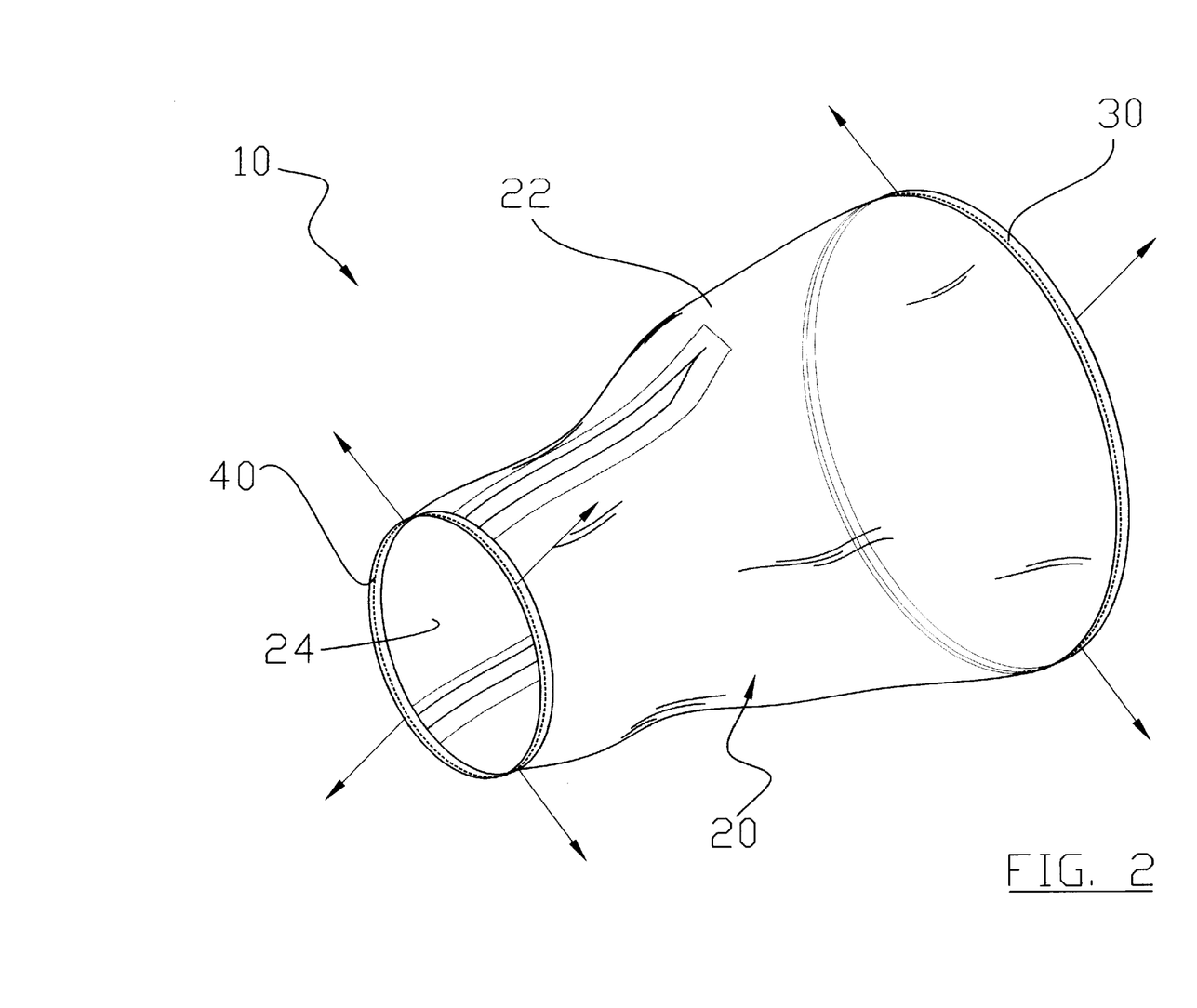
FIG. 2 is an upper perspective view of the distal ends radially extended outwardly.
Figure 4:
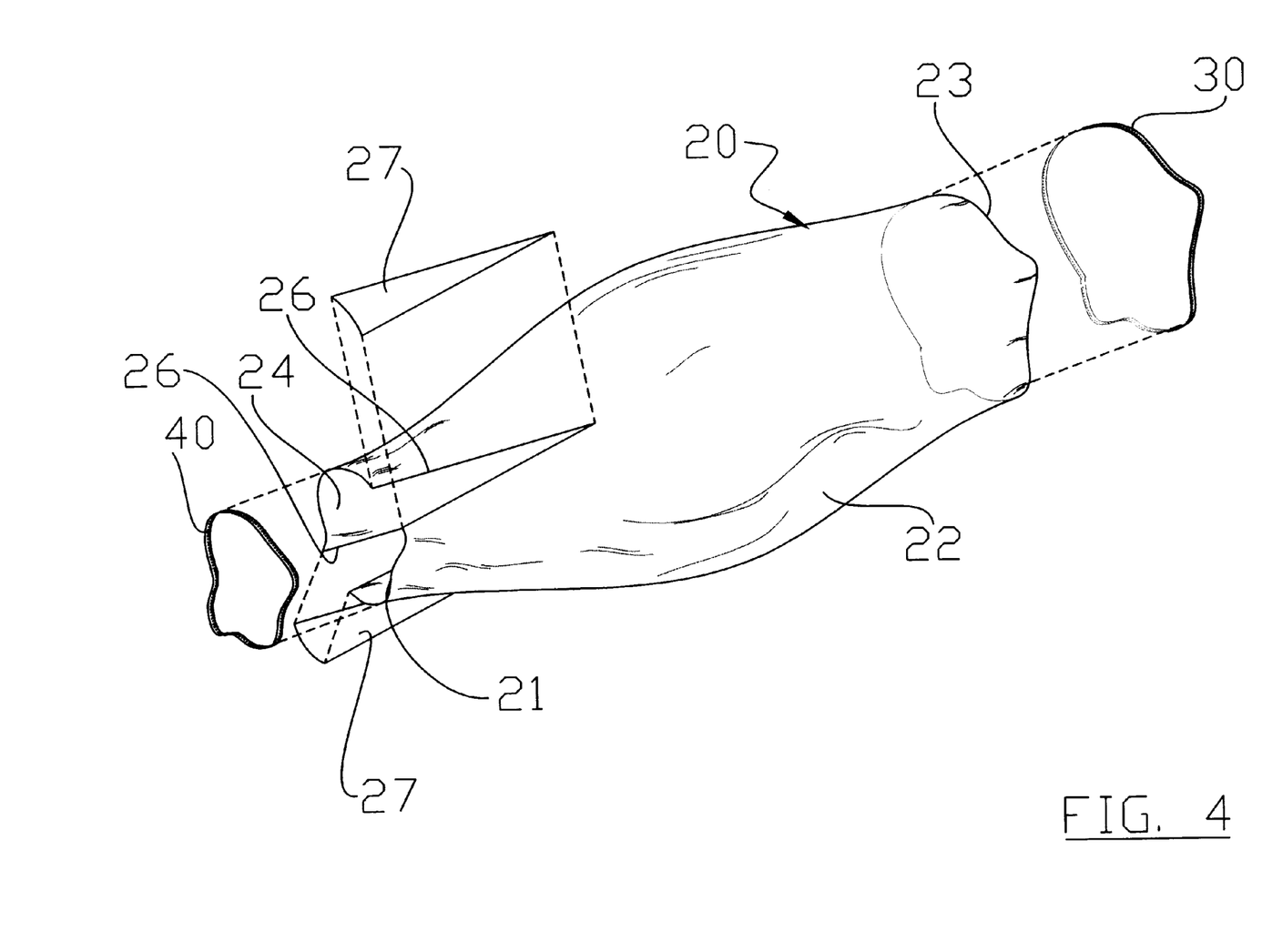
FIG. 4 is an exploded view illustrating the removal of the removed sections within the narrow end.
Figure 6:
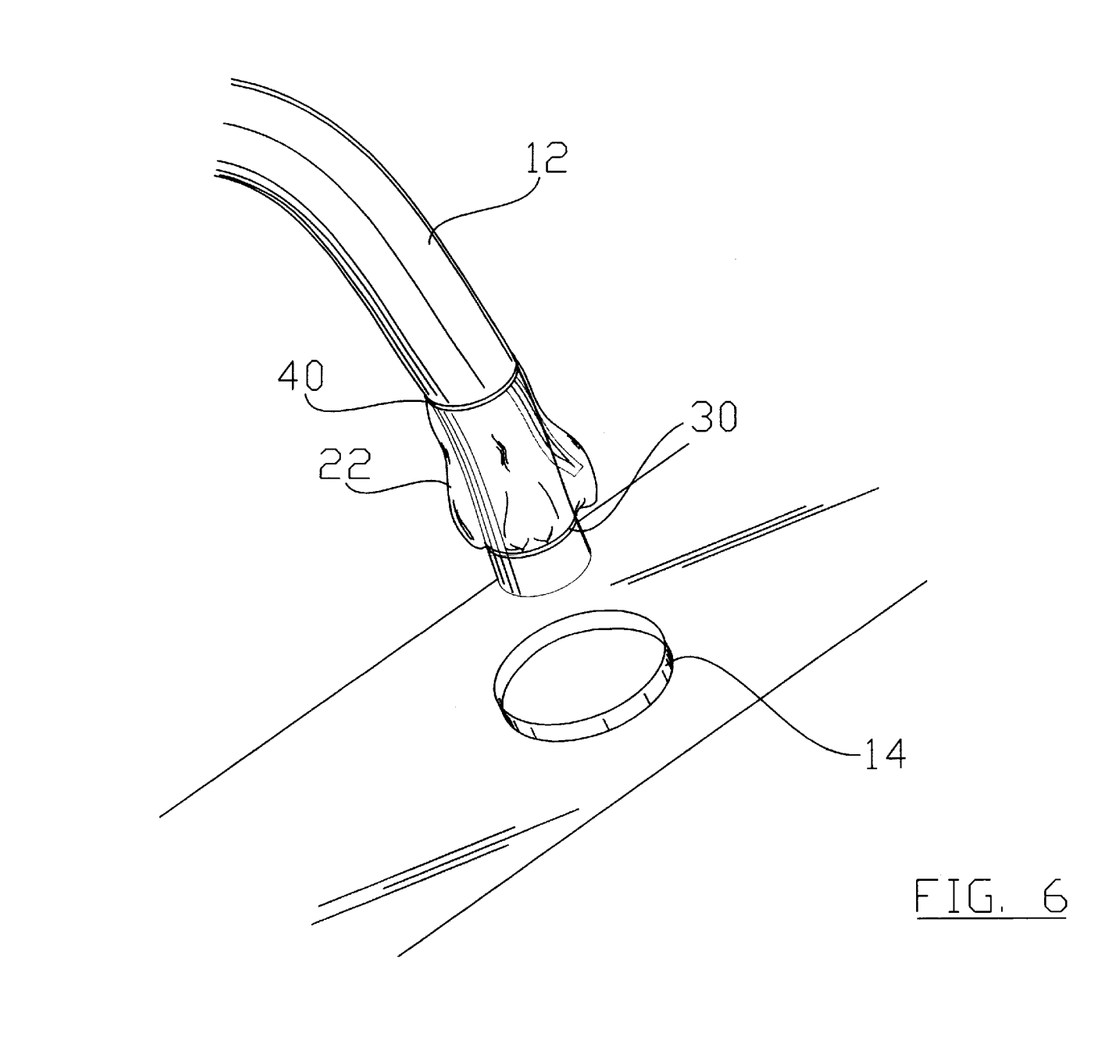
FIG. 6 is an upper perspective view of the present invention attached about a loading tube.
Figure 7:
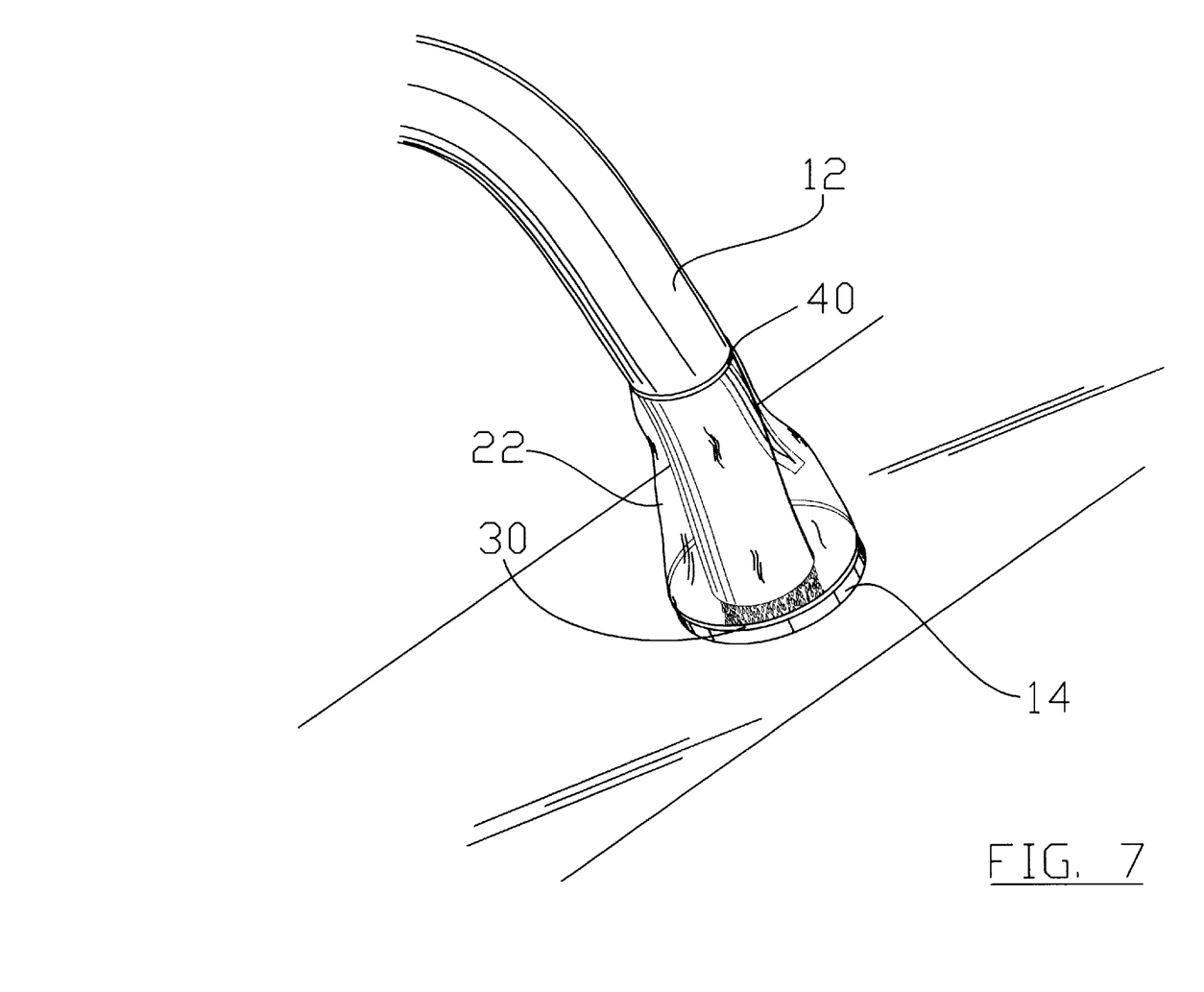
FIG. 7 is an upper perspective view of the present invention attached about both the loading tube and the container hatch.

The tubular skirt 20 has a broad end 23 and a narrow end 21 opposite of the broad end 23 as best shown in FIG. 4 of the drawings. The tubular skirt 20 preferably tapers from the broad end 23 to the narrow end 21 as best illustrated in FIGS. 1 and 2 of the drawings. The narrow end 21 of the tubular skirt 20 is attachable about the loading tube 12 as shown in FIGS. 6 and 7 of the drawings. The broad end 23 of the tubular skirt 20 is attachable about the container hatch 14 as shown in FIG. 7 of the drawings.

As shown in FIGS. 1, 2 and 4 of the drawings, a first elastic band 30 is attached to the broad end 23 of the tubular skirt 20. The first elastic band 30 is attached to the tubular skirt 20 such that the broad end 23 has a smaller size than when fully expanded thereby allowing expansion of the broad end 23 to fit about the container hatch 14. The first elastic band 30 is preferably attached to the broad end 23 of the tubular skirt 20 by conventional sewing processes, however other attachment systems may be utilized for attaching the first elastic band 30 about the outer perimeter of the broad end 23.

As shown in FIGS. 1, 2 and 4 of the drawings, a second elastic band 40 is attached to the narrow end 21 of the tubular skirt 20 opposite of the first elastic band 30. The second elastic band 40 is attached to the tubular skirt 20 such that the narrow end 21 has a smaller size than when fully expanded thereby allowing expansion of the narrow end 21 to fit about the loading tube 12. The second elastic band 40 is preferably attached to the narrow end 21 of the tubular skirt 20 by conventional sewing processes, however other attachment systems may be utilized for attaching the second elastic band 40 about the outer perimeter of the narrow end 21.

Figure 3:
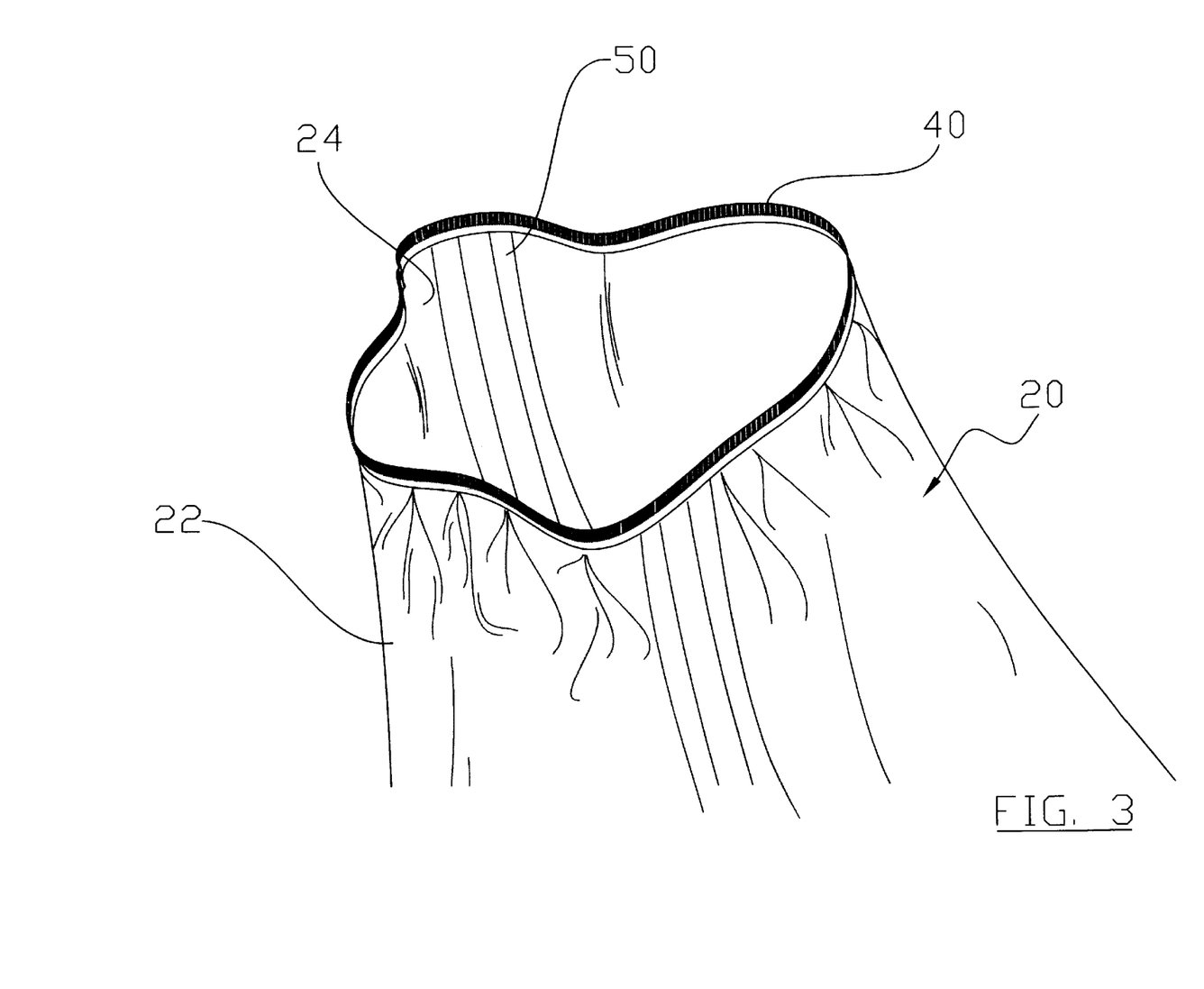
FIG. 3 is a magnified view of the second elastic band.
Figure 5:
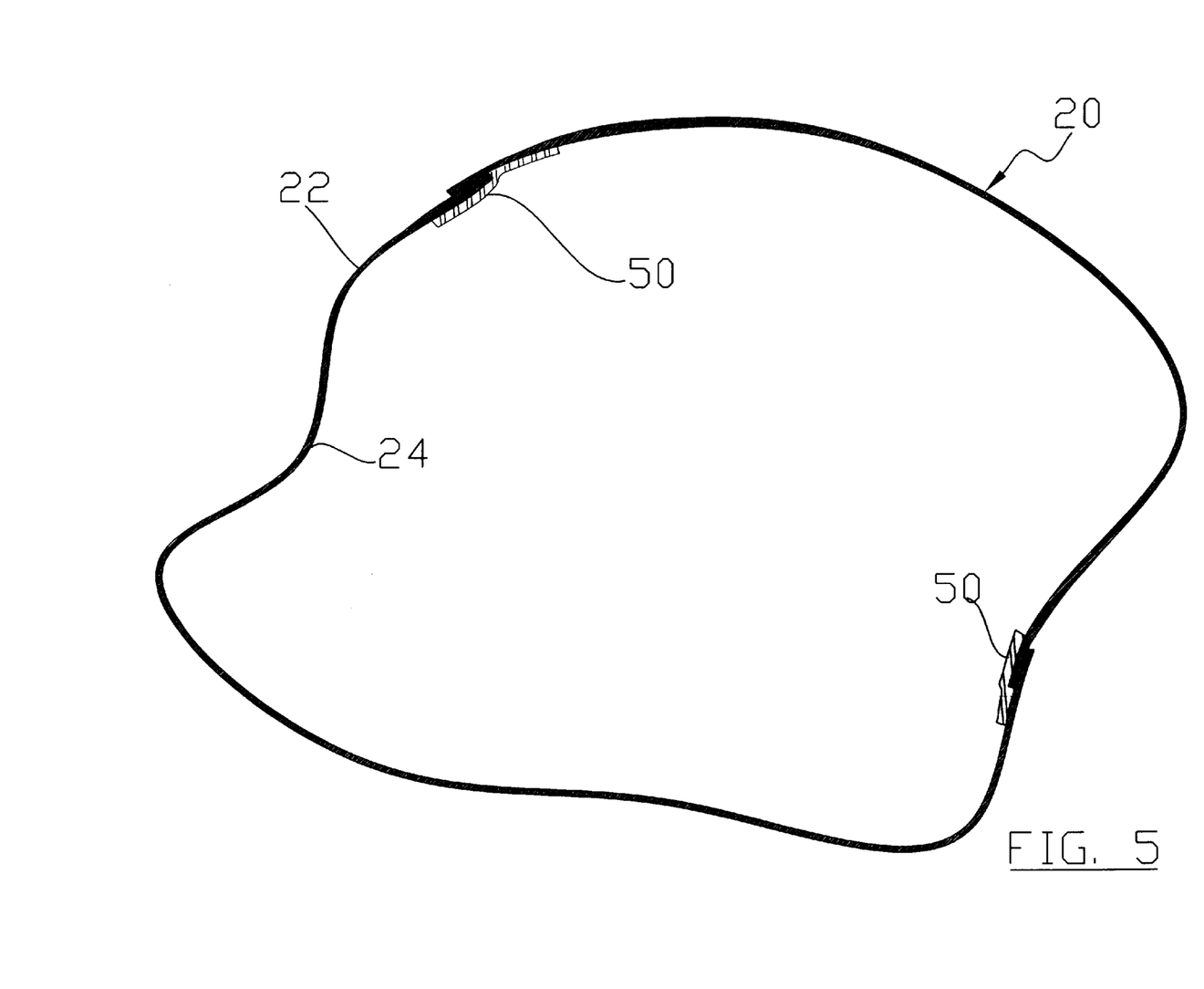
FIG. 5 is a cross sectional view taken along line 5—5 of FIG. 1.

As shown in FIG. 4, the tubular skirt 20 is preferably formed from a consistent diameter structure wherein removed sections 27 from the narrow end 21 create tapered cutouts 26. The cutouts 26 are preferably comprised of a pair of cutouts 26 in opposition to one another as shown in FIG. 4 of the drawings. The cutouts 26 taper outwardly from the inner portion of the tubular skirt 20 to the narrow end 21 of the tubular skirt 20. The opposing edges of the tubular skirt 20 surrounding the cutouts 26 are then overlapped and attached to one another by an adhesive, chemical agent or heating processes thereby providing a narrow tapering structure for the narrow end 21. A reinforcement band 50 is preferably attached about the intersection of the tubular skirt 20 to prevent separation of the attached opposing edges of the tubular skirt 20 as best shown in FIGS. 3 and 5 of the drawings. The reinforcement band 50 is preferably comprised of a length of plastic or other flexible material.

In use, the user positions the narrow end 21 about the loading tube 12 as shown in FIG. 6 of the drawings. The user pulls the broad end 23 of the tubular skirt 20 up upon the loading tube 12 as further shown in FIG. 6 of the drawings. The loading tube 12 is then properly positioned within the container hatch 14 and the broad end 23 is then snugly positioned about the container hatch 14 as shown in FIG. 7 of the drawings. The material is then dispensed from the loading tube 12 into the hatch 14. After the loading is completed, the user then removes and discards the tubular skirt 20.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A material loading skirt system positionable about a loading tube and a container hatch during loading of material, comprising:
    a tubular skirt having a first end and a second end;
    a first elastic band attached to said first end of said tubular skirt such that a relaxed position of said first end is narrower than an expanded position of said first end, wherein said first elastic band is sewn onto said first end; and
    a second elastic band attached to said second end of said tubular skirt such that a relaxed position of said second end is narrower than an expanded position of said second end.

2. The material loading skirt system of claim 1, wherein said second end has a larger size than said first end.

3. The material loading skirt system of claim 2, wherein said tubular skirt is tapered from said second end to said first end.

4. The material loading skirt system of claim 1, wherein said tubular skirt is comprised of a flexible plastic material.

5. The material loading skirt system of claim 4, wherein said flexible plastic material is transparent.

6. The material loading skirt system of claim 1, wherein said tubular skirt is comprised of polyethylene.

7. The material loading skirt system of claim 1, wherein said second elastic band is sewn onto said second end.

8. The material loading skirt system of claim 1, wherein said tubular skirt is comprised of a non-permeable material.

9. The material loading skirt system of claim 8, wherein said tubular skirt has a circular cross sectional area.

10. A material loading skirt system positionable about a loading tube and a container hatch during loading of material, comprising:

- a tubular skirt having a first end and a second end, wherein said first end is narrower than said second end;
- at least one tapered cutout extending into said first end creating a pair of opposing edges, said opposing edges secured to one another in an overlapping manner at an intersection;
- a first elastic band attached to said first end of said tubular skirt such that a relaxed position of said first end is narrower than an expanded position of said first end; and
- a second elastic band attached to said second end of said tubular skirt such that a relaxed position of said second end is narrower than an expanded position of said second end.

11. The material loading skirt system of claim 10, wherein said tubular skirt is tapered from said second end to said first end.

12. The material loading skirt system of claim 10, wherein said tubular skirt is comprised of a flexible plastic material.

13. The material loading skirt system of claim 12, wherein said flexible plastic material is transparent.

14. The material loading skirt system of claim 10, wherein said tubular skirt is comprised of polyethylene.

15. The material loading skirt system of claim 10, wherein said first elastic band is sewn onto said first end.

16. The material loading skirt system of claim 10, wherein said second elastic band is sewn onto said second end.

17. The material loading skirt system of claim 10, including a reinforcement band secured about said intersection of said opposing edges for reinforcing the attachment thereof.

18. A material loading skirt system positionable about a loading tube and a container hatch during loading of material, comprising:

- a tubular skirt having a first end and a second end;
- a first elastic band attached to said first end of said tubular skirt such that a relaxed position of said first end is narrower than an expanded position of said first end; and
- a second elastic band attached to said second end of said tubular skirt such that a relaxed position of said second end is narrower than an expanded position of said second end, wherein said second elastic band is sewn onto said second end.

* * * * *